(No Model.)

W. P. JAUS.
PNEUMATIC TIRE.

No. 522,663. Patented July 10, 1894.

Witnesses:
P. F. Meany
Wm Shafer

Inventor,
William P. Jaus,
By Joseph A. Minturn
His Attorney.

THE NORRIS PETERS CO., PHOTO-LITHO., WASHINGTON, D. C.

UNITED STATES PATENT OFFICE.

WILLIAM P. JAUS, OF INDIANAPOLIS, INDIANA, ASSIGNOR OF ONE-HALF TO CARL H. SCHULLER, OF SAME PLACE.

PNEUMATIC TIRE.

SPECIFICATION forming part of Letters Patent No. 522,663, dated July 10, 1894.

Application filed February 15, 1894. Serial No. 500,205. (No model.)

*To all whom it may concern:*

Be it known that I, WILLIAM P. JAUS, a citizen of the United States, residing at Indianapolis, in the county of Marion and State of Indiana, have invented certain new and useful Improvements in Pneumatic Tires; and I do hereby declare the following to be a full, clear, and exact description of the invention, such as will enable others skilled in the art to which it appertains to make and use the same.

This invention relates to improvements in pneumatic tires for bicycle or other wheels and has for its object the protection of the air tube by means of an impregnable armor and to provide an armor that will adjust itself to the dimensions of the air tube when inflated and to provide means for protecting the tube from the edges and ends of the armor so as to prevent the latter from cutting through the tube.

I accomplish the objects of the invention by the mechanism illustrated in the accompanying drawings, in which—

Figure 1:
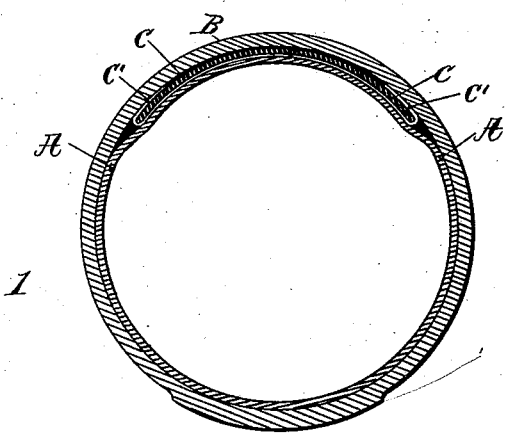
Figure 2:
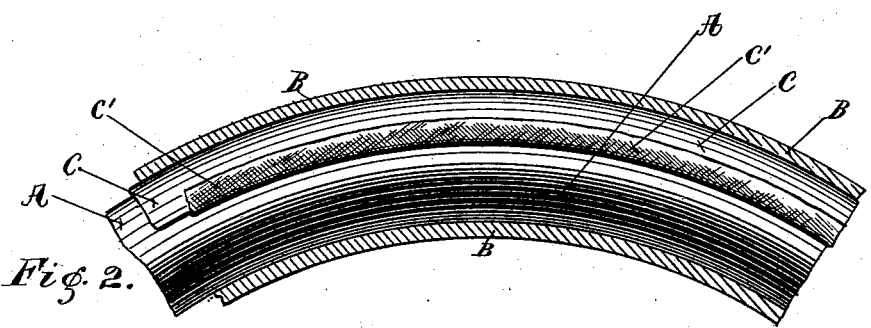
Figure 3:
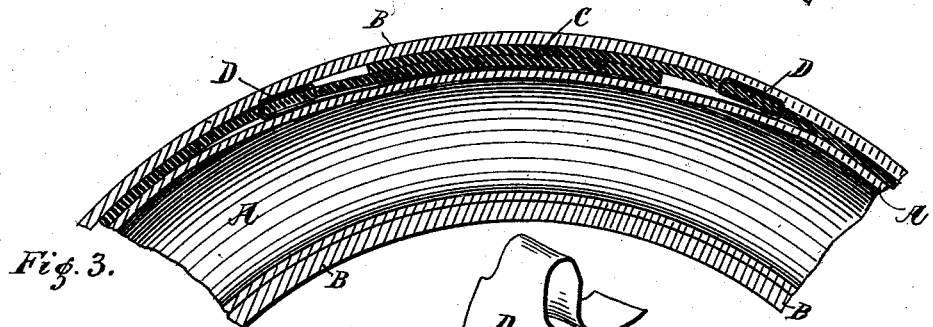
Figure 4:

Figure 1 is a transverse section of a pneumatic tire armored in accordance with the spirit of my invention. Fig. 2 is a detail showing a portion of a tire and showing the outer shoe sectioned to expose the air tube and its armor. Fig. 3 is a detail in longitudinal section of my improved tire, showing the overlapped ends of the armor forming the joint in same. Fig. 4 is a detail showing the armor at the joint rubber shield connecting the two ends. One end of the shield is shown removed from its wrappings through the slots in the armor in order to show the slots.

Similar letters of reference refer to like parts throughout the several views of the drawings.

A is the air tube of usual construction and which will be inflated with air in the usual manner.

B is the enveloping shoe which serves as a protection to the air tube and is also of usual construction.

C is my improved armor which will be constructed of any suitable material as sheet steel bent in the form of a ring or circle and concaved on its inner side so as to fit upon the outside of the air tube and when placed in position will in consequence occupy a position between the air tube and the shoe as shown in the drawings.

The ends of the armor will be made to overlap each other and will be free to slide longitudinally as the air tube is inflated in order to suit the increased diameter of the tire.

Spring steel will be preferably used in the construction of the armor and will be tempered and shaped so as to fit close to the air tube at all times and will be sufficiently strong throughout its entire surface to resist and turn aside any sharp pointed object that would otherwise puncture the air tube.

To guard against the wearing or cutting of the sides of the air tube by the sides of the armor or the free end of the same it will be best to interpose a protecting medium. With this in view the concave side of the armor will be lined with suitable woven material as canvas, shown at C' in the drawings, and the edges of the material bound over the edges of the armor plate as shown in Figs. 1 and 2. The canvas will be cemented or otherwise securely fastened to the armor.

To protect the air tube from the free end of the armor which might cut through the tube by the continued motion when the wheel is in use, a protecting strip or shield D preferably of rubber will be interposed between the loose end and the tube and to maintain the shield in its right position the ends of the shield will be secured to the armor. This may be done by cementing but the preferable method will be as shown in the drawings in which two transverse slots *d* and *d'* will be made in the armor near the lapped ends and the ends of the rubber shield woven through the slots in the manner as shown in Fig. 3. As the armor is expanded the rubber shield will stretch to accommodate the increased length.

Having thus fully described my invention, what I claim as new, and wish to secure by Letters Patent, is—

In a pneumatic tire, the combination, with the air tube, of a steel armor plate bent in the form of a ring, disposed on the outside of the air tube and entirely surrounding it, the two ends of the plate overlapping each other, each end being provided with transverse slots, and an extensible protecting strip secured to the ends of the plate by having its ends woven through said slots, substantially as described.

In testimony whereof I affix my signature in presence of two witnesses.

WILLIAM P. JAUS.

Witnesses:
JOSEPH A. MINTURN,
T. F. MEANY.